US011999056B2

(12) United States Patent
Rokahr et al.

(10) Patent No.: US 11,999,056 B2
(45) Date of Patent: Jun. 4, 2024

(54) BRAKE ASSEMBLY FOR A DRIVE DEVICE IN A ROBOT

(71) Applicant: FRANKA EMIKA GMBH, Munich (DE)

(72) Inventors: Tim Rokahr, Munich (DE); Andreas Spenninger, Karlsfeld (DE); Carles Calafell Garcia, Munich (DE)

(73) Assignee: FRANKA EMIKA GMBH, Munich (DE)

( * ) Notice: Subject to any disclaimer, the term of this patent is extended or adjusted under 35 U.S.C. 154(b) by 282 days.

(21) Appl. No.: 17/609,598

(22) PCT Filed: May 7, 2020

(86) PCT No.: PCT/EP2020/062793
§ 371 (c)(1),
(2) Date: Dec. 10, 2021

(87) PCT Pub. No.: WO2020/225394
PCT Pub. Date: Nov. 12, 2020

(65) Prior Publication Data
US 2022/0212354 A1    Jul. 7, 2022

(30) Foreign Application Priority Data

May 8, 2019   (DE) .................... 10 2019 112 023.3

(51) Int. Cl.
*B25J 19/00*       (2006.01)
*F16D 125/38*     (2012.01)

(52) U.S. Cl.
CPC ....... *B25J 19/0004* (2013.01); *F16D 2125/38* (2013.01)

(58) Field of Classification Search
CPC ........ B25J 19/0004; B25J 9/106; B25J 17/00; F16D 2125/38
USPC .................................................. 318/362, 372
See application file for complete search history.

(56) References Cited

U.S. PATENT DOCUMENTS

| 9,334,911 B2 * | 5/2016 | Kameta ................... F16D 65/18 |
| 10,286,552 B2 * | 5/2019 | Monreal ................ B25J 9/1633 |
| 2019/0109549 A1 | 4/2019 | Odagiri et al. |

FOREIGN PATENT DOCUMENTS

| CN | 109366522 A | 2/2019 |
| DE | 102015116609 A1 | 3/2017 |
| EP | 3045273 A1 | 7/2016 |
| EP | 3348362 A1 | 7/2018 |
| KR | 101915394 B1 | 11/2018 |
| WO | 2017152928 A1 | 9/2017 |

OTHER PUBLICATIONS

International Search Report issued in International Application No. PCT/EP2020/062793, dated Jul. 23, 2020, 3 pages.

* cited by examiner

*Primary Examiner* — David Luo
(74) *Attorney, Agent, or Firm* — Dilworth IP, LLC

(57) ABSTRACT

A braking device for a drive device of a joint between two links of a robot arm including a brake activating device and a locking element, wherein the brake activating device is designed to bring the locking element into engagement with a rotor of the drive device as required in order to halt rotation of the rotor, the locking element being designed as a bolt and the braking element being designed as a braking star with webs which have a defined impact surface for the bolt.

19 Claims, 4 Drawing Sheets

BRAKE ASSEMBLY FOR A DRIVE DEVICE IN A ROBOT

FIELD OF THE INVENTION

The present invention relates to a braking device for a drive device of a joint between two links of a robot arm or manipulator, in particular a multi-axis jointed-arm robot.

BACKGROUND OF THE INVENTION

In particular for robots for use in the field of human-robot collaboration (HRC), it is imperative for safety reasons to provide an emergency stop or braking device in the event of malfunctions or in the event of a sudden failure of the power supply, which is designed to stop the robot arm as quickly as possible in order to prevent injuries to an operator of the robot system or to prevent the object manipulated by the robot arm in the course of the activity to be performed by it or the robot arm itself from being damaged. Such an emergency stop can also be caused directly by the user himself, for example by actuating an emergency switch.

For example, a wide variety of embodiments of braking devices are known for jointed-arm robots, with the aid of which the movement of the robot arm can be brought to an abrupt stop, or at least to a very rapid stop within a defined period of time.

In European Patent No. 3 045 273, for example, a braking mechanism has been proposed in which a friction ring is mounted coaxially with the motor shaft, with which a pin of a locking device cooperates by radially engaging the pin in the friction ring in an emergency. Due to the fact that the friction ring is rotatable relative to the motor shaft under a defined frictional engagement, a low braking deceleration of the rotational movement is realized when the radial pin engages.

German Patent Application No. 10 2015 116 609 A1 discloses a braking device in which a braking star is non-rotatably connected to a shaft of the drive device and has radially projecting prongs with which a spring-actuated head bolt engages for an emergency stop. The ends of the prongs are pointed or chamfered in such a way that part of the force is introduced into the bend of the prong when it engages with the head bolt, which acts quasi as a bending beam, and part is deflected longitudinally to this beam. Nevertheless, as a result of the high rotational speeds, the impact forces between the head bolt and the prongs are so high that a very pronounced elastic deformation occurs which, after a certain number of braking cycles, can possibly lead to material failure of the prongs.

SUMMARY OF THE INVENTION

Based on this, it is an object of the invention to provide a braking device for a drive device of a joint between two links of a robot arm, in particular of an articulated arm robot of lightweight construction, which offers increased functional safety, and which has an inherent long service life.

This object is solved with a braking device for a drive device of a joint according to claim 1. Furthermore, this object is solved by a corresponding drive device according to claim 11 and by a robot according to claim 12.

According to the invention, therefore, a braking device is proposed for a drive means of a joint between two links of a robot arm, comprising a brake activation device and a locking element, wherein the brake activation device is adapted to bring the locking element into engagement, when required, with a braking element which is rotationally fixedly connected to a rotor of the drive means in order to stop rotation of the rotor, wherein the locking element is formed as a bolt and the braking element is formed as a braking star, which has at least one web projecting radially from the axis of the rotor, and the web having an impact surface which interacts with the bolt when engaged, and which is curved inwards with respect to a direction of rotation of the braking star and has a radius which corresponds at least to the radius of the bolt, and the impact surface extends in the radial direction beyond a distance between the axis of the rotor and the axis of the bolt.

This ensures that the bolt comes to rest against the impact surface as a whole over a section that extends radially outward beyond the radially inwardly directed quarter-circle circumference of the edge of the bolt. When the impact surface of the web comes into contact with the stationary bolt, the forces are distributed in the web in such a way that elastic energy dissipation takes place, which, viewed in the radial direction, exerts a reduced leverage effect on the web acting as a bending beam, since a portion of the forces is also introduced into the web radially outward.

Irrespective of a suitable choice of material for the pin and the braking star going beyond this, according to the invention the load level in terms of energy absorption on impact can be reduced for the web to such an extent that the risk of mechanical failure, i.e., breakage, can be largely avoided. The service life of the braking device can thus be increased compared to the prior art.

In one embodiment, the impact surface can widen in the circumferential direction to guide the bolt away from the web, or in other words, viewed from the center between two webs, the edge surface of the braking star runs towards the impact surface of the web in such a way that the bolt virtually runs up against the impact surface as the braking star continues to rotate until it stops. This guidance can already lead to an initial, albeit friction-related, slight weakening of the impact forces.

In accordance with the invention, it is provided that the web has at least one recess radially on the inside, in particular essentially in the region of the radius for the edge surface of the braking star between two webs. The recess can in principle have any shape, but preferably a symmetrical geometry, such as a circular hole. In a preferred embodiment of the braking star, the web has two uniform holes that are equidistant from a central axis of the web.

These holes serve to redirect the forces occurring when the bolt strikes the impact surface of the web in such a way that elastic dissipation is realized in the region of the web, which keeps deformation of the web low or converts it in such a way that the leverage forces on the web, i.e., on this as a radially extending bending beam, are weakened.

Thus, in a preferred embodiment of the braking star according to the invention, it is provided that a line extending radially between the axis of the rotor and the center of a hole intersects the impact surface at a point, the radius associated with said point being smaller than the distance between the axis of the rotor and the axis of the bolt.

In another preferred embodiment of the braking star according to the invention, it is provided that this line extending radially between the axis of the rotor and the center of a hole intersects the impact surface at a point where the greatest impact forces can occur when the bolt is engaged.

In a still further preferred embodiment of the braking star according to the invention, it is provided that a radius formed by the distance of the center of the hole to the axis of the rotor is at least equal to or smaller than a radius formed by the distance of the axis of the bolt to the axis of the rotor minus the bolt radius.

In this context, it is further advantageous if a hole diameter is at least equal to or smaller than the bolt radius.

In order to ensure fast reaction behavior in the event of an emergency stop, the invention provides that not only one web projects from the braking star, but that the latter has several, two or preferably three webs which are arranged equidistantly to one another in the circumferential direction.

Thereby, according to the invention, it is provided that when N webs are arranged equidistantly to each other in the circumferential direction, an opening angle of each web determining the circumferential width of a web shall be 360°/3N.

In a further aspect, the invention relates to a drive device for a joint between two links of a robot arm having a braking device according to one of the embodiments described above. In a further aspect, the invention relates to a robot having a robot arm with a plurality of links arranged to be movable relative to each other by a joint, wherein at least one joint has a drive device configured in such a way.

Preferably, the braking device according to the invention is to be arrangeable coaxially around a rotor formed by the drive axle or motor shaft of a drive device, either on the drive side or on the output side thereto, as this drive device is described, for example, in German Patent Application No. 10 2016 004 787. In particular, but not exclusively, the invention is directed to such drive devices or joints of an articulated arm robot, in particular of lightweight construction for use in the field of human-robot collaboration.

According to the invention, the recesses provided in the course of the web and the impact surface of the web radially extending beyond the radius resulting with respect to the center of the bolt cooperate in such a way that such an elastic deformation is introduced in the web which leads to a faster decrease in speed when the web impacts the bolt. The selection and design of the recesses together with the impact surface, depending on the material for the web, influence the spring characteristic of the web, which allows a defined braking process to be realized. The risk of buckling or buckling fracture of the beam can be excluded.

Further advantages and features of the present invention will become apparent from the description of the embodiment illustrated with reference to the accompanying drawings, in which

DETAILED DESCRIPTION OF THE INVENTION

Figure 1:
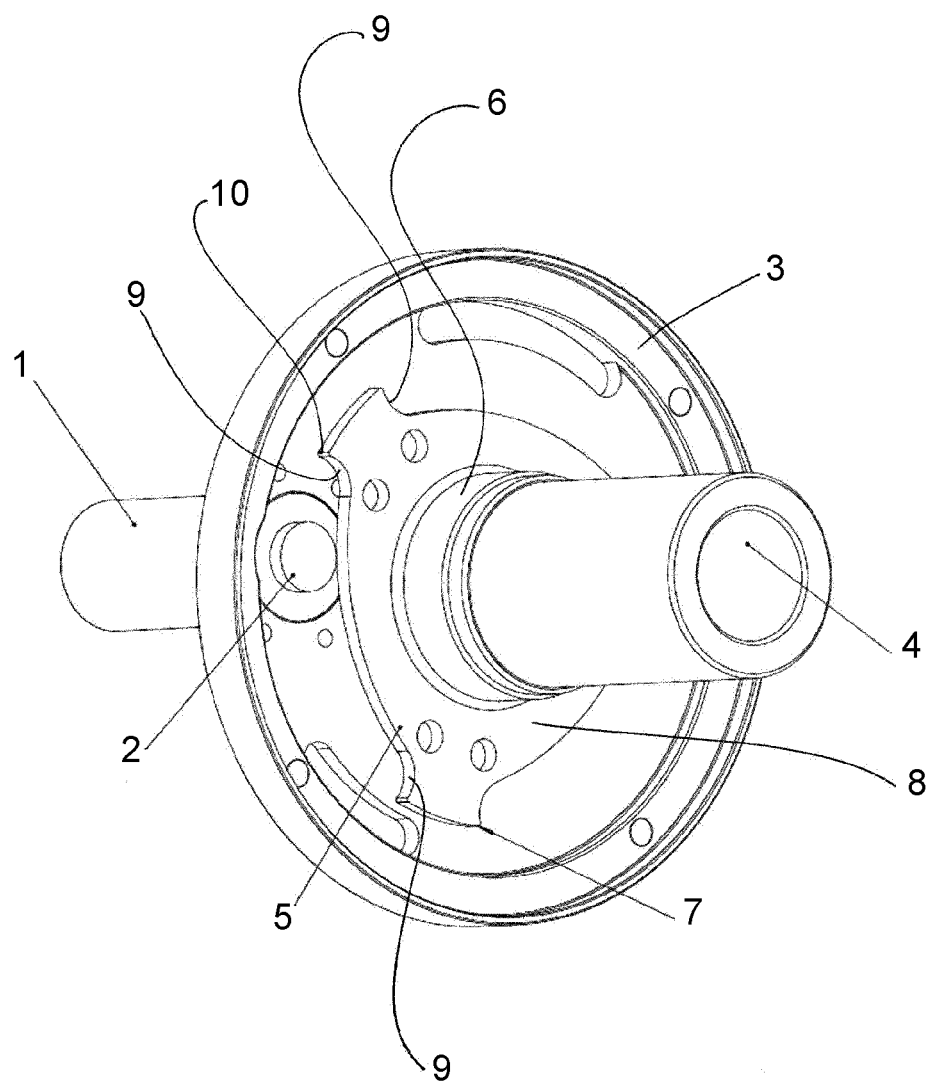
FIG. 1 is an exemplary perspective view of a braking device according to the invention.

The braking device according to the invention shown schematically in FIG. 1 can preferably be attached to one end of a drive device of a joint between two links of a robot arm.

The braking device according to the invention comprises a brake activation device 1, which can be designed, for example, as a magnet-activated holding or spring mechanism. The brake activation device 1 is designed and configured to activate a locking element in the form of a bolt 2, when required, for example in the event of an unexpected power failure, as a result of which the bolt 2 is then driven upwards, for example by a spring.

By means of a bearing washer 3, which is fixed to the housing, i.e., is connected to a housing of the drive device, which is not shown, a shaft or rotor 4 of the drive device can be mounted via known bearings which are not shown. The brake activation device 1 with the bolt 2 is stationarily arranged on the bearing washer 3.

The rotor 4 carries a braking element in the form of a braking star 5, which is connected, e.g., bonded, to the rotor 4 in a rotationally fixed manner via an axially extending sleeve 6.

The braking star 5 comprises three webs 7 spaced at an equal circumferential angle to one another, which extend radially from an inner ring 8 of the braking star 5.

By means of the preferably magnetically actuated brake activation device 1, the bolt 2 can be moved between a locking position, which it assumes without energy supply, and a release position assumed when energy is supplied. FIG. 1 shows the bolt 2 in such a release position; this bolt 2 is arranged below the rotating braking star 5 as seen in the axial direction, consequently outside engagement with one of the webs 7. When the energy is switched off, the bolt is forced in the direction of the braking star 5 by a spring force of a spring, which is then released by a magnet that is no longer activated, and thus comes between two adjacent webs 7 of the rotating braking star 5, whereby an abrupt braking of the drive shaft or rotor 4 is then realized as soon as the next web 7 comes up against the bolt 2.

Figure 2:
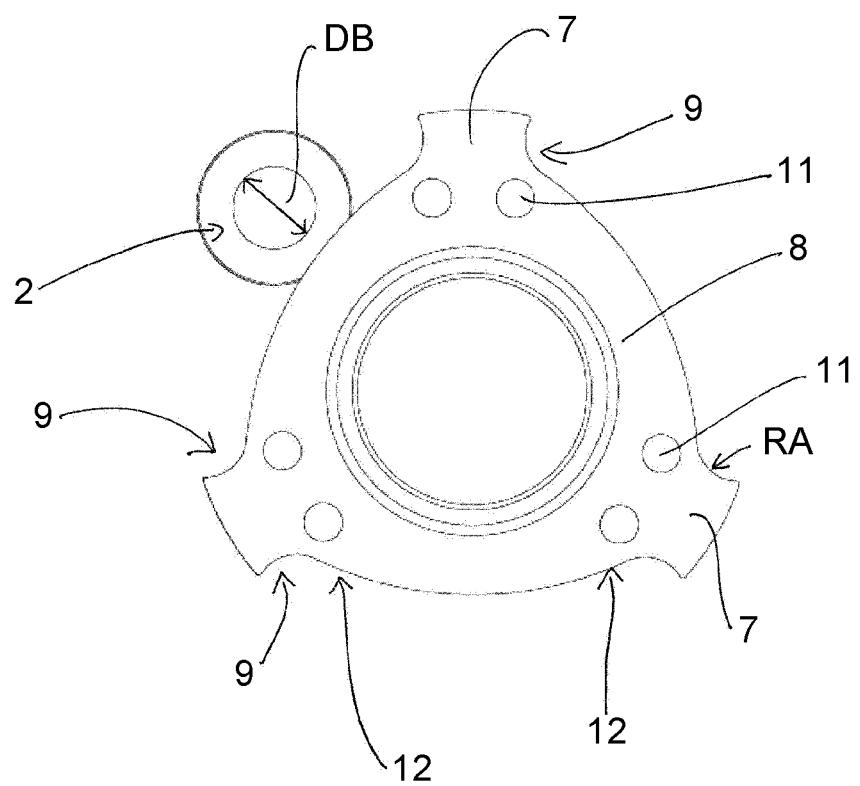
FIG. 2 is a schematic representation of the arrangement of a bolt in relation to a braking star.
Figure 3A:
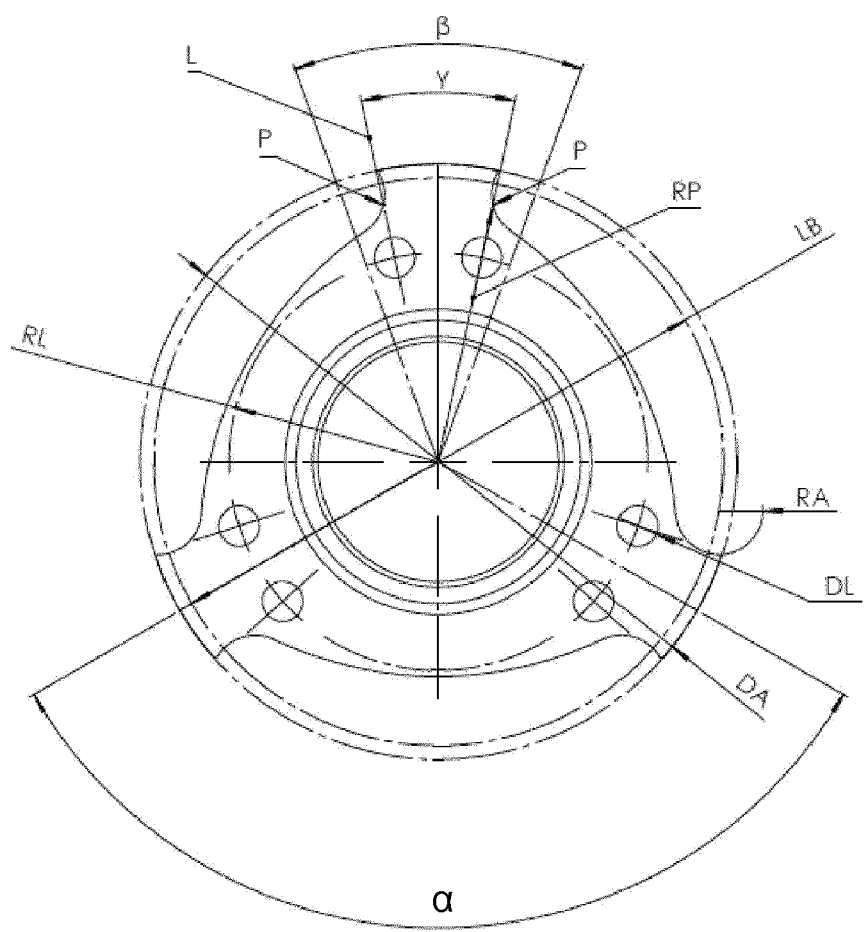
FIG. 3a is a schematic representation of a braking star with corresponding dimensions in one embodiment according to the invention.

In FIG. 2, the relationship of the arrangement of the bolt 2 with respect to the braking star 5 is shown, with individual geometric dimensions indicated. Further relative relationships of the dimensions are illustrated in FIGS. 3a and 3b.

The bolt 2 has a diameter DB. The webs 7 projecting radially from the inner ring 8 each have on their two sides an impact surface 9 which is curved inwardly with respect to a respective direction of rotation of the braking star 5 and comprises a radius RA which corresponds at least to the radius DB/2 of the bolt 2, so that the bolt 2 can come to bear congruently and continuously over its entire surface in the impact surface 9 during brake engagement.

Figure 3B:
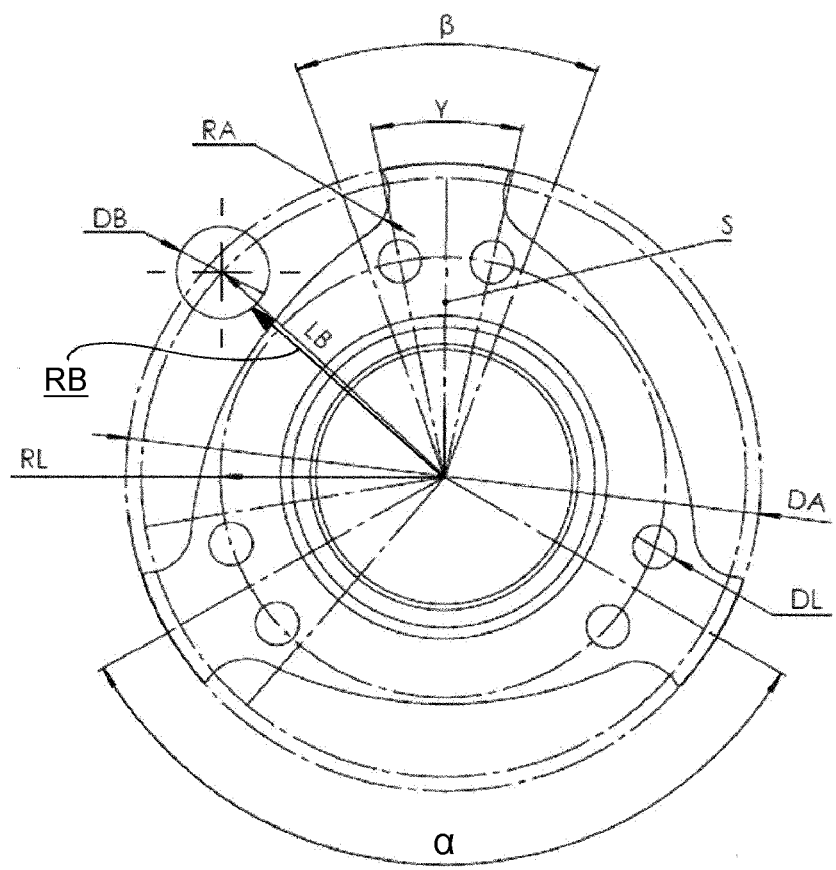
FIG. 3b is a schematic representation of the braking star and the relative position of the bolt with corresponding dimensions in one embodiment according to the invention.

According to the invention, it is provided that the impact surface 9 extends in radial direction beyond a distance LB which defines the distance between the axis of the rotor 4 and the axis of the bolt 2, as illustrated in FIG. 3b.

This projection also defines the outer diameter DA of the webs 7, i.e., of the braking star 5. The outer edges of the webs 7 are provided with a chamfer 10 in order to avoid notch effects on the bolt 2 when it is hit as a result of unintentional tolerance deviations.

Each web 7 has a pair of holes 11 the centers of which lie on a common radius RL. The holes 11 each have the same diameter DL and are arranged at an equal distance from a central axis S of the webs 7.

As can be seen in FIG. 2, the impact surface 9 widens in each case as seen in the circumferential direction away from the web 7. Such a widening 12 supports easy guiding of the bolt 2 when the braking star 5 runs up against it during brake engagement, shortly before the impact surface 9 meets the bolt 2.

In accordance with the invention, the braking star 5 is further configured such that a line L extending between the axis of the rotor 4 and the center of a hole 11 intersects the impact surface 9 at a point P, wherein the radius RP associated with the point P is smaller than the distance LB between the axis of the rotor 4 and the axis of the bolt 2. Ideally, this point P is the point in the region of the impact surface 9 where the greatest impact forces can occur upon engagement of the bolt 2.

According to the invention, the radius RL on which the centers of the holes 11 lie should be selected so that this radius RL is at least equal to or preferably smaller than a radius RB formed from the distance LB of the axis of the bolt 2 to the axis of the rotor 4 minus the bolt radius DB/2.

Preferably, the diameter DL of the holes 11 is at most half the radius DB/2 of the bolt 2.

In the embodiment shown, three webs 7 are shown, each of which maintains an equal angle α of 120° with respect to one another. The width of the webs 7 in the circumferential direction includes an angle β of 40°, whereby the distance between the two holes 11 per web 7 in the circumferential direction includes an angle γ which is not less than half of the angle β.

According to the invention, the aforementioned dimensions and size ratios ensure that effective dissipation of the energy upon impact of the bolt 2 on the impact surface 9 of the braking star 5 is accomplished by the fact that the web 7 can deform elastically only to such an extent and in such a force-diverting manner that the leverage effect on it is kept low, so that material fatigue hardly or not at all occurs and the service life of the braking device implementing such a braking star 5 can be considerably increased.

In addition to the design of the braking star 5 according to the invention, in order to make the braking device correspondingly rigid with respect to the above-mentioned dimensional ratios, it is further provided according to the invention to provide a material pairing between bolt 2 and braking star 5 which supports the rigidity behavior.

In addition, in order to keep the weight of a joint device between two links of a robot arm as low as possible, the braking star 5 can be designed as a sheet metal part the thickness of which ideally does not exceed 2 mm. Accordingly, the thickness of the bolt 2 should be in the range of this dimension. For the realization of a compact structure, the bolt 2 performs a stroke upon brake engagement which consequently does not fall below this dimension. The arrangement of the bolt 2 in the release position and the stroke height in braking engagement are therefore selected in accordance with the invention in such a way that the bolt 2 can come into contact with its circumferential edge section exactly flat in the impact surface 9.

In order to obtain ideal elastic deformation behavior for this, the invention provides for the bolt 2 to be made of a soft free cutting steel, e.g., type 1.0715 (11SMN30+C+A), while the braking star 5 is made of a heat-treatable steel with high strength and at the same time high toughness, such as type 1.7225 (42CrMo4). The mechanical material properties of the braking star 5 in terms of hardness, tensile strength, yield strength and elongation at break are thus higher than those of the bolt 2, if necessary, taking into account appropriate measures for material quenching and tempering and surface treatment.

A further advantage of the design of a braking star with defined recesses according to the invention is that, as a result of the mass-dependent lower acceleration and the associated lower maximum torque, the loads on a gear unit and the rotor or the drive shaft of the drive device are lower. Conversely, this means that the speed can be reduced more quickly at brake engagement.

According to the invention, the selection of the number and/or the shape and/or the arrangement and the position of the recesses or holes can be used to specifically influence the setting of optimum process parameters with regard to acceleration and braking behavior.

LIST OF REFERENCE SIGNS

1 Brake activation device
2 Bolt
3 Bearing washer
4 Rotor
5 Braking star
6 Sleeve
7 Web
8 Inner ring
9 Impact surface
10 Chamfer
11 Holes
12 Expansion
DB Diameter bolt
RA Radius of impact surface
LB Distance axis rotor—axis bolt
DA Outer diameter of webs/braking star
DL Diameter holes
S Center axis web
L Line axis rotor—center hole
P Intersection point line L in impact surface
RP Radius intersection point P
RL Radius in relation to center holes
RB Radius LB minus DB/2

The invention claimed is:

1. A braking device for a drive device of a joint between two links of a robot arm comprising a brake activation device and a locking element, wherein the brake activation device is designed to bring the locking element into engagement with a braking element when required, which is connected to a rotor of the drive device in a rotationally fixed manner in order to stop a rotation of the rotor, the locking element being designed as a bolt and the braking element being designed as a braking star which comprises at least one web projecting radially from an axis of the rotor, characterized in that
the web comprises an impact surface which interacts with the bolt when engaged, and which is curved inwards with respect to a direction of rotation of the braking star and comprises a radius (RA) which corresponds at least to a radius (DB/2) of the bolt, and in that the impact surface extends in the radial direction beyond a distance (LB) between the axis of the rotor and an axis of the bolt.

2. The braking device according to claim 1, in which the impact surface expands away from the web in a circumferential direction for guiding the bolt.

3. The braking device according to claim 2, in which the web comprises at least one recess located radially inwards.

4. The braking device according to claim 1, in which the web comprises at least one recess located radially inwards.

5. The braking device according to claim 4, in which two uniform holes are provided which are equally spaced from a central axis (S) of the web.

6. The braking device according to claim 5, in which a line (L) extending radially between the axis of the rotor and a center of a hole intersects the impact surface at a point (P), the radius (RP) associated with the point (P) being smaller than the distance (LB) between the axis of the rotor and the axis of the bolt.

7. The braking device according to claim 6, in which a line (L) extending radially between the axis of the rotor and a center of a hole intersects the impact surface at a point (P) where greatest impact forces occur when the bolt is engaged.

8. The braking device according to claim 6, in which a radius (RL) formed by the distance of a center of the hole to the axis of the rotor is at least equal to or smaller than a radius (RB) formed by the distance (LB) of the axis of the bolt to the axis of the rotor minus the bolt radius (DB/2).

9. The braking device according to claim 6, in which a hole diameter (DL) is at least equal to or smaller than the bolt radius (DB/2).

10. The braking device according to claim 5, in which a line (L) extending radially between the axis of the rotor and a center of a hole intersects the impact surface at a point (P) where the greatest impact forces occur when the bolt is engaged.

11. The braking device according to claim 10, in which a radius (RL) formed by the distance of a center of the hole to the axis of the rotor is at least equal to or smaller than a radius (RB) formed by the distance (LB) of the axis of the bolt to the axis of the rotor minus the bolt radius (DB/2).

12. The braking device according to claim 10, in which a hole diameter (DL) is at least equal to or smaller than the bolt radius (DB/2).

13. The braking device according to claim 5, in which a radius (RL) formed by the distance of a center of the hole to the axis of the rotor is at least equal to or smaller than a radius (RB) formed by the distance (LB) of the axis of the bolt to the axis of the rotor minus the bolt radius (DB/2).

14. The braking device according to claim 13, in which a hole diameter (DL) is at least equal to or smaller than the bolt radius (DB/2).

15. The braking device according to claim 5, in which a hole diameter (DL) is at least equal to or smaller than the bolt radius (DB/2).

16. The braking device according to claim 1, in which N webs being arranged equidistantly to each other in a circumferential direction are provided, and an opening angle (a) of each web determining a circumferential width of a web is 360°/3N.

17. The braking device according to claim 16, in which three webs are provided.

18. A drive device for a joint between two links of a robot arm having a braking device according to claim 1.

19. A robot comprising a robot arm having a plurality of links arranged to be movable relative to each other by a joint, at least one joint comprising a drive device according to claim 18.

* * * * *